Dec. 6, 1960  L. PÉRAS  2,962,981
RAILROAD VEHICLE SUSPENSION
Filed April 29, 1958

INVENTOR.
LUCIEN PÉRAS
BY
ATTORNEY

United States Patent Office 2,962,981
Patented Dec. 6, 1960

2,962,981

RAILROAD VEHICLE SUSPENSION

Lucien Péras, Billancourt, France, assignor to Regie Nationale des Usines Renault, Billancourt, France Filed Apr. 29, 1958, Ser. No. 731,650

Claims priority, application France May 13, 1957

4 Claims. (Cl. 105—199)

The present invention relates to linkages for connecting and pivoting two pieces on each other, in view of permitting the rectilinear guiding of one piece with respect to the other within certain limits, a particularly adequate application of this arrangement residing in the suspension system of vehicles.

The principle of the linkage according to this invention is derived from the known geometrical method of constructing an ellipse or a circle which consists in utilizing a strip of paper of which two points describe two straight fixed lines at right angles to each other, the curve proper being determined by a third point of the strip.

In comparison, the arrangement of the device proposed according to this invention is such that one of the aforesaid straight lines is described by the point connecting one of the elements with the linkage, which is interposed between said parts, and that this straight line has the desired orientation relative to the other element.

This device is particularly advantageous when applied to the suspension system of a vehicle where it is frequently necessary to provide a connection controlled by guiding means between movable elements or parts interconnected by resilient members, within the limits of their permissible stroke, clearance or movement.

These various features and advantages will appear more clearly as the following description proceeds with reference to the accompanying drawing forming part of this specification and illustrating diagrammatically by way of example a few embodiments of the invention. In the drawing.

Figure 1:
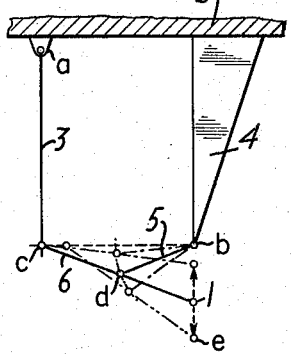
Figure 1 is a diagrammatic view illustrating a guiding mechanism according to this invention.

Referring first to Fig. 1, the reference numeral 1 designates the point of which it is desired to ensure the rectilinear guiding movement at right angles to the plane of the piece 2. To this end, the linkage proposed herein comprises a link 3 pivoted at $a$ on the piece 2, the latter comprising a rigidly-connected bracket 4 having a height equal to the length of link 3, another link 5 being pivoted at $b$ on the bracket 4, as shown. The links 3 and 5 are also pivoted at $c$ and $d$ respectively on a third link 6, the outer end $e$ of this link corresponding to the point 1; furthermore, the links 3 and 5 are so dimensioned that $bd=cd=de$.

Thus, as the triangle $c$, $b$, $e$ is rectangular at $b$ when $c$ describes a small circular arc centered at $a$, the straight line $b$—$c$ remains substantially parallel to itself, this being also true for $b$—$e$. In fact, $d$ can only rotate about $b$, this movement corresponding to the construction of a circle by means of a strip of paper of which the points $c$ and $e$ describe the straight lines $b$—$c$ and $b$—$e$ of the figure. Therefore, point 1 describes a substantially rectilinear path under $b$, within certain limits, notably those whereby the path of $c$ is comparable to a straight line. As shown in Fig. 1, the point $c$ undergoes only slight displacement for a corresponding substantial displacement of the point 1 along the line $b$—$e$. Thus, while $b$ is fixed relative to 2, the lines $b$—$c$ and $b$—$e$ will remain substantially parallel to themselves and point 1 moves vertically in relation to the member 2.

Figure 2:
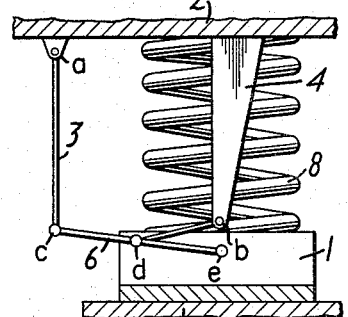
Figures 2 and 3 are diagrammatic elevational views showing the application of the device illustrated in Fig. 1 to a railway car suspension system.
Figure 4:
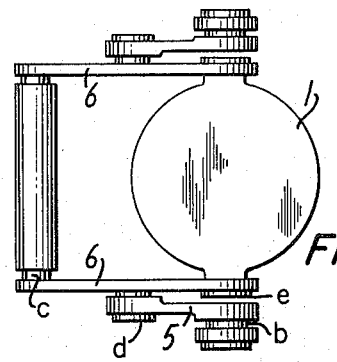
Figures 4 and 5 are a plan view from above and an elevational view, respectively, of a typical embodiment of the mechanism shown in Fig. 2.
Figure 5:
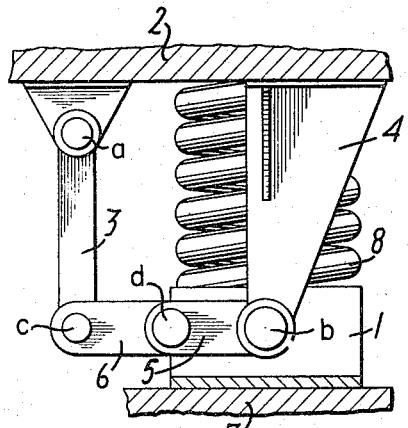

Figure 2 shows diagrammatically a practical application of this guiding device to the suspension system of a railway car truck. In this case, the piece 2 is the vehicle body and piece 1 is a shoe in frictional engagement with the truck 7, a resilient member, for example a coil spring 8, being interposed between the shoe 1 and body 2. Of course, the component elements of the device according to this invention are then disposed on either side of the spring, as clearly shown in the embodiment of Figs. 4 and 5, wherein the pieces and pins joints of the system are designated by reference numerals corresponding to those of the device illustrated in Fig. 1.

Figure 3:
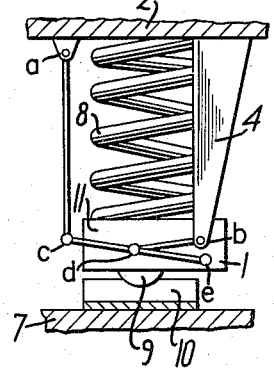

In the modified embodiment illustrated in Fig. 3 the arrangement is designed with a view to permit a greater freedom of movement of the truck, the piece 1 on which the spring 8 is caused to bear comprising a ball-shaped bearing member 9 adapted to pivot in a corresponding part-spherical recess formed in the friction shoe 10 also in frictional engagement with the truck part 7. In this case and in order to ensure an adequate holding of the piece 1 the pin joints $e$ are shifted relative to the center 11 of the ball-shaped bearing member 9 and located approximately in the horizontal plane containing this point.

Figure 6:
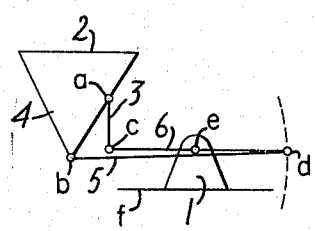
Figure 6 is a diagrammatic view illustrating another guiding mechanism according to this invention.

The guiding of the piece 1 may also be obtained by means of a linkage of substantially the same design as the preceding one, as shown in Fig. 6, except that in this modified embodiment the relation $bd=cd=de$ is not complied with; thus, in comparison, this arrangement corresponds simply to the method of constructing an ellipse.

In Fig. 6, the parts corresponding to those of Fig. 1 are designated by the same reference numerals. Assuming that $c$ (which is to accomplish movements of relatively small amplitude) is moved in a direction substantially parallel to the base $f$, whereas $e$ describes a straight line at right angles to $f$, the point $d$ will describe an elliptical curve. According to the known geometrical construction this ellipse would have the following characteristics:

$$\frac{\text{major axis}}{2}=cd$$

and $$\frac{\text{minor axis}}{2}=ed$$

the elliptical arc at the vertex $d$ being shown in the figure.

On the other hand it will be appreciated that, provided that the length of link 5 ($b$—$d$) is approximately equal to the radius of curvature of this eliptical arc, the point $e$ will move substantially along a straight line at right angles to $f$ during variations in the relative spacing of pieces 1 and 2, under the best conditions, that is, when $c$—$e$ (link 6) is parallel to $f$ for the average relative spacing between these two pieces.

Figure 7:
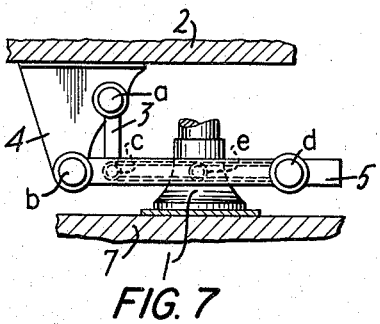
Figures 7 and 8 are an elevational view and a plan view from above, respectively, illustrating a typical embodiment of the linkage shown in Fig. 6 also in the specific application thereof to a suspension system.
Figure 8:
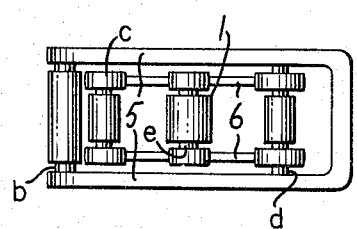

Figures 7 and 8 illustrate a typical application of the guiding device of this invention to a railway car truck suspension system, wherein the shoe 1 is in frictional engagement with the truck 7, the links and pin joints being designated by the same reference numerals as in Fig. 6.

I claim:

1. In combination with a railroad vehicle having a frame and a truck supporting said frame with an interposed vertically compressible spring engaged with a support element carried by said truck, means for insuring rectilinear vertical movement of said support element relatively to said frame, said means comprising a first lever and a bracket connected to said frame, said lever and said bracket extending downwardly from said frame toward said truck to substantially the same level, said bracket carrying at its lower end a second lever, said second lever and said first lever being connected to a third lever at two spaced-apart points of said third lever, the normal inclination of said third lever being substantially horizontal and said third lever being connected to the support element at a third point which is spaced from said two spaced-apart points.

2. In combination with a railroad vehicle having a frame and a truck supporting said frame with an interposed vertically compressible spring engaged with a support element carried by said truck, means for insuring rectilinear vertical movement of said support element relatively to said frame, said means comprising a first lever and a bracket connected to said frame, said lever and said bracket extending downwardly from said frame toward said truck to substantially the same level, said bracket carrying at its lower end a second lever, said second lever and said first lever being connected to a third lever at two spaced-apart points of said third lever, the normal inclination of said third lever being substantially horizontal and said third lever being connected to the support element at a third point which is spaced from said two spaced-apart points, one of said two spaced-apart points being at one end of said third lever, the other of said two spaced-apart points being substantially at the center of said third lever and said third point being at the other end of said third lever.

3. In combination with a railroad vehicle having a frame and a truck supporting said frame with an interposed vertically compressible spring engaged with a support element carried by said truck, means for insuring rectilinear vertical movement of said support element relatively to said frame, said means comprising a bracket connected to said frame, and a first lever pivotally mounted relatively to said frame and said lever and said bracket extending downwardly relatively to said frame toward said truck to substantially the same level, said bracket carrying at its lower end a second lever, said second lever and said first lever being connected to a third lever at two spaced-apart points of said third lever, the normal inclination of said third lever being substantially horizontal and said third lever being connected to the support element at a third point which is spaced from said two spaced-apart points, said two spaced-apart points being at the ends of said third lever and said third point being intermediate said ends of said third lever.

4. In combination with a railroad vehicle having a frame and a truck supporting said frame with an interposed vertically compressible spring engaged with a support element carried by said truck, means for insuring rectilinear vertical movement of said support element relatively to said frame, said means comprising a first lever and a bracket connected to said frame, said lever and said bracket extending downwardly from said frame toward said truck to substantially the same level, said bracket carrying at its lower end a second lever, said second lever and said first lever being connected to a third lever at two spaced-apart points of said third lever, the normal inclination of said third lever being substantially horizontal and said third lever being connected to the support element at a third point which is spaced from said two spaced-apart points, said support element being pivotally connected to a second support element carried by said truck.

References Cited in the file of this patent

UNITED STATES PATENTS

| 2,782,732 | Rossell | Feb. 26, 1957 |
| 2,879,596 | Kroenlein | Mar. 31, 1959 |